March 9, 1937.  W. J. SKIBBE  2,073,269
ANTIJACK KNIFE FIFTH WHEEL
Filed July 20, 1936
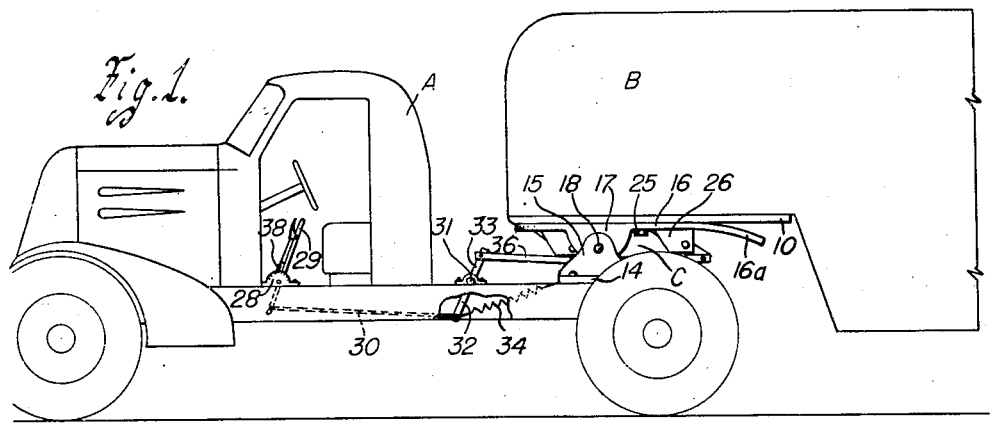
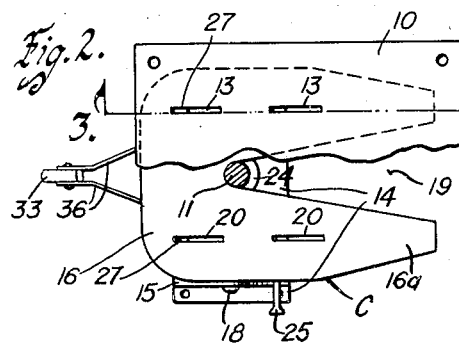
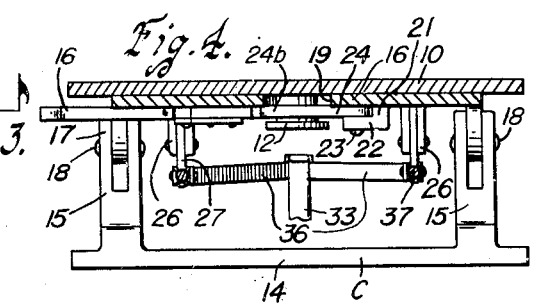
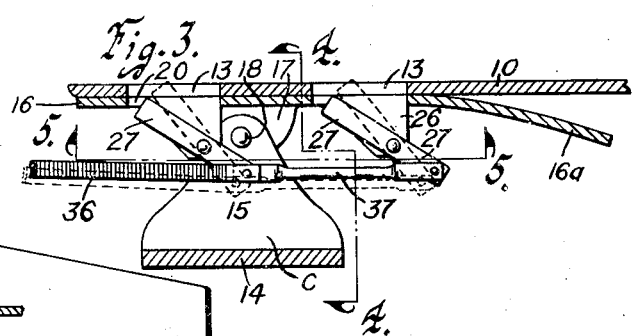
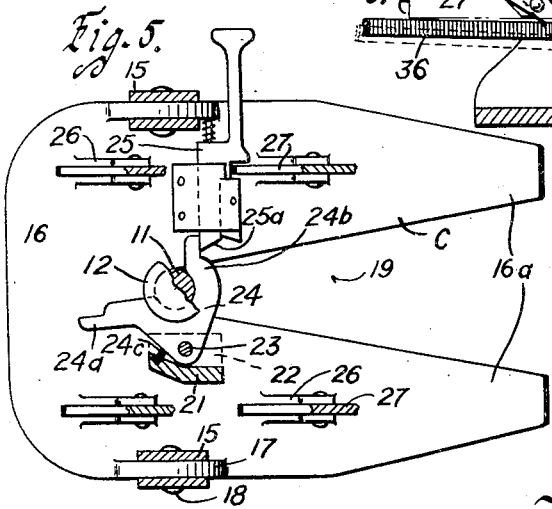
Inventor
~William J. Skibbe~
by Bair, Freeman, & Sinclair
Attorneys
Witness
H. S. Munzenmaier Patented Mar. 9, 1937

2,073,269

UNITED STATES PATENT OFFICE 2,073,269

ANTIJACKKNIFE FIFTH WHEEL

William J. Skibbe, Des Moines, Iowa

Application July 20, 1936, Serial No. 91,549

4 Claims. (Cl. 280—33.1)

The object of my invention is to provide an anti-jack knife fifth wheel affording a hitch for connecting tractors or trucks and trailer hitch or semi-trailer.

More particularly, it is my purpose to provide a device of the kind under consideration, having a fifth wheel member to be secured to a tractor, and a fifth wheel member to be secured to a trailer, and to provide means, whereby such members may normally rotate with relation to each other, which structure is provided with means, whereby when desired or whereby in emergencies, the two members may be locked together against such rotation to prevent jack-knifing.

It is especially my purpose in this connection to provide means whereby a locking device or devices can be projected through both members for affording a strong and positive lock against relative rotation of the members.

Another object is to provide such a device, which will so operate that when the trailer tractor is backed into proper position, the fifth wheel members on the trailer and tractor respectively will be automatically locked together.

With these and other objects in view, my invention consists in the construction, arrangement and combination of the various parts of my anti-jack knife fifth wheel, whereby the objects contemplated are attained, as hereinafter more fully set forth, pointed out in my claims, and illustrated in the accompanying drawing, in which:

Figure 1 is a side elevation of a tractor and trailer equipped with an anti-jack knife fifth wheel embodying my invention.

Figure 2 is a top or plan view of the fifth wheel, parts being broken away and parts being shown in section.

Figure 3 is a detailed, sectional view taken on the line 3—3 of Figure 2.

Figure 4 is a vertical, detailed sectional view taken on the line 4—4 of Figure 3; and Figure 5 is an inverted, horizontal sectional view taken on the line 5—5 of Figure 3.

For purposes of better illustration, I have shown in the accompanying drawing, a tractor in the form of a truck, indicated generally at A, and a trailer or semi-trailer indicated generally at B.

Secured to the under side of the frame of the trailer B is a fifth wheel member comprising a plate 10, having a king bolt 11, extending downwardly from it and provided with a flange or head 12 at its lower end.

The plate 10 has four regularly spaced holes 13 to receive locking elements. These holes 13 may extend through the plate or might be in the form of recesses in the under side of the plate.

Secured to the frame of the tractor A is a bracket C having the base 14 and the upstanding bifurcated laterally spaced supports 15. Above the supports 15 is a second fifth wheel member 16, having the spaced, downwardly extending ears 17, which are pivoted as at 18 to the supports 15.

The rear part of the fifth wheel member 16 is curved downwardly as at 16a for more conveniently making the hitch when the trailer is to be hitched to the tractor.

The fifth wheel member 16 has a deep notch 19 extending from its rear end substantially toward its forward end, forwardly tapering.

The fifth wheel member 16 also has regularly spaced holes 20 extending through it. The holes 20 and the holes 13 may be in the form of elongated slots as here particularly illustrated or might be in some other forms.

I shall first describe the latch device used in hitching the trailer to the tractor.

On the under side of the fifth wheel member 16 near the apex of the notch 19 is a bracket 21 having an arm 22 extending toward the apex of the notch 19.

Pivoted on the pin 23 between the arm 22 and the fifth wheel member 16 is the central part of a bell crank latch 24, having the arms 24a and 24b.

In Figure 5, the latch 24 is shown in latching position, where the sliding spring-actuated keeper 25 has one end projected into the path of the arm 24b in such manner as to prevent unlatching.

In latching or locking the trailer to the tractor for hauling, the front end of the trailer is held up in any suitable well-known way, so that the rear end of the tractor can back under the semi-trailer.

The latch 24 is swung around from its position shown in Figure 5 clockwise, and until the arm 24b clears the notch 19. Then as the tractor backs up for the hitching operation, the fifth wheel member 16 slides underneath the fifth wheel member 10, the king bolt 11 is received in the notch 19, and the backing of the tractor is continued until the king bolt 11 strikes the arm 24a and pushes it forwardly, thus swinging the arm 24b to the position shown in Figure 5, where it serves as a lock, and is held in place by the keeper 25, the end of which is beveled as at 25a for obvious reasons.

The trailer and tractor will then be hitched together so that the fifth wheel members 10 and 16 have rotary movement with relation to each other around the axis of the king bolt 11.

The tractor and trailer are also articulated on a horizontal axis extending transversely of the tractor in the line of the pivots for the ears 17 and supporting members 15.

I shall now describe one embodiment of the locking feature, which I consider perhaps the most important or at least one of the most important features of my invention.

It is well known that truck drivers have considerable trouble and from time to time have fatal accidents, due to the fact that the trailer jack-knifes with relation to the tractor.

It is my purpose to prevent such a catastrophe.

I have shown one form of device by which such prevention can be accomplished.

On the under side of the hitch member 10 and in proper location with relation to the holes 20 are brackets 26. When the tractor is directly ahead of the trailer, the respective holes 13 register with the respective holes 20.

Pivoted between their ends to the brackets 26 are locking levers 27. These locking levers are so arranged that their upper ends may be moved from position where they are below the holes 20 to the position where they project through the holes 20 and into the holes 13, so that they then serve to lock the fifth wheel plate 16 and the fifth wheel plate 10 against relative rotation on the axis of the king bolt 11.

On the tractor, there is mounted a toothed segment or the like 28 adjacent to which is a pivoted lever 29.

Connected with the lower end of the lever 29 and below its pivot is a rearwardly extending link 30.

Mounted on the frame of the tractor A is a transverse shaft 31. The shaft 31 has the downwardly extending arm 32 and the upwardly extending arm 33. The downwardly extending arm 32 is connected to the rear end of the link 30. A spring 34 secured to the lower end of the arm 32 yieldingly tends to hold the arm 32 at the rearward position of its movement.

Connected to the upwardly extending arm 33 are the forward ends of arms 36. The arms 36 extend divergingly rearwardly and are connected at their rearward ends to laterally spaced bars 37. There are a pair of bars 37 and each one is connected at its forward end to one of the bars 36.

Each bar 37 is also connected to the lower arms of a pair of fore-and-aft aligned levers 27.

The spring 34 is connected to the frame of the tractor and preferably to the lower end of the arm 32, so as to normally hold the parts, where the levers 27 are in locking position.

The lever 29 has a pawl 38 for coacting with the sector 28 so that it can be locked in various positions for thus holding the locking mechanism against being accidentally moved from one position to another.

If in the operation of the tractor and the truck, the driver should see a necessity for locking the truck and tractor together against jack-knifing, he can accomplish his purpose by simply moving the lever 29 forwardly.

If at that time, the holes 20 do not register with the holes 13, the tractor and truck will soon swing about on the king bolt until such registry does occur, and then the mechanism can be manipulated to bring the upper parts of the arm 27 through the holes 20 and into the holes 13.

Whenever the locking structure is in the position last described, there can be no rotation of the fifth wheel member 10 with relation to the fifth wheel member 16.

All that is necessary to release this locking device is to move the lever 29 back to its normal position, where it and its associated mechanism will serve to render the levers 27 inoperative.

Changes may be made in the structure herein described without departing from the real spirit of my invention. For example, any sort of movable device may be used for projecting through the fifth wheel member 16 and into the fifth wheel member 10, and it is my intention to cover by my claims, any modification in structure or arrangement of parts, which may be reasonably included within the scope of my invention and of such claims.

I claim as my invention:

1. In a device of the kind described, a fifth wheel member having recesses in its under side to receive locking elements and having a downwardly projecting headed king bolt, a second fifth wheel member, means for mounting the second fifth wheel member on a propelled vehicle for swinging movement on a horizontal, transverse axis, said second fifth wheel member having a deep notch in its rearward edge, forwardly tapered for receiving said king bolt, means on the second fifth wheel member for locking the king bolt in said notch, said second fifth wheel member having a series of holes extending through it and adapted to register with the recess in the first fifth wheel member when the fifth wheel members are in a certain position of their relative rotary movement, a series of locking elements comprising levers pivoted between their ends on said second fifth wheel member, a transverse shaft adapted to be mounted on a tractor, an arm projecting from such shaft, a pair of arms connected with said first arm and diverging therefrom, a second pair of arms pivoted at their forward ends to said first arms and pivoted to said locking elements, whereby the rocking of said shaft will serve to move the ends of said locking elements through the holes in the second fifth wheel member into locking engagement with the first fifth wheel member, and a lever and operating mechanism for rocking said shaft.

2. In a device of the kind described, a fifth wheel member, a second fifth wheel member, means for detachably connecting the two fifth wheel members together for relative movement on a vertical axis, said second fifth wheel member having holes extending through it, a pair of locking levers pivotally supported between their ends on the second fifth wheel member, an arm pivoted to the lower ends of the levers, means for actuating the arm for projecting the free ends of the levers through said holes into locking engagement with the first fifth wheel member, and means tending to yieldingly hold the levers in operative position.

3. In a device of the kind described, a fifth wheel member having locking recesses in its under surface, a second fifth wheel member having a plurality of holes extending through it, said fifth wheel members having coacting parts for connecting them together for relative rotary movement on a vertical axis, and means for locking said fifth wheel members together against such rotary movement, said means comprising a plurality of locking levers pivotally mounted on the under side of the second fifth wheel member, and means for operating said movable locking levers for projecting them through the holes in the second fifth wheel member into the recesses in the first fifth wheel member, said means including a rock shaft, arms operatively connected with the shaft and with said levers, and means for actuating the rock shaft.

4. In a fifth wheel structure, a fifth wheel member adapted to be attached to a vehicle, a second fifth wheel member adapted to be attached to a trailer, means for detachably connecting the two fifth wheel members together for relative movement on a vertical axis one above the other, the lower of the fifth wheel members having an opening through it, a locking member movably mounted on the lower fifth wheel member adjacent to said opening and adapted to be moved to position projecting through said opening and having locking engagement with the upper fifth wheel member or to position out of locking engagement with the upper fifth wheel member, yielding means tending to hold the locking member in locking position, and means for holding the locking member in inoperative position.

WILLIAM J. SKIBBE.